United States Patent
Han et al.

(12) 
(10) Patent No.: US 11,336,864 B1
(45) Date of Patent: May 17, 2022

(54) WAITING NOTIFICATIONS FOR VIDEOCONFERENCING SUB-MEETINGS

(71) Applicant: Zoom Video Communications, Inc., San Jose, CA (US)

(72) Inventors: Lin Han, Los Altos, CA (US); Nitasha Walia, Sunnyvale, CA (US); Yamin Wei, Zhejiang (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/244,583

(22) Filed: Apr. 29, 2021

(51) Int. Cl.
  *H04N 7/14* (2006.01)
  *H04L 65/4061* (2022.01)
  *H04N 7/15* (2006.01)
  *H04L 65/403* (2022.01)

(52) U.S. Cl.
  CPC .......... *H04N 7/147* (2013.01); *H04L 65/403* (2013.01); *H04L 65/4061* (2013.01); *H04N 7/15* (2013.01)

(58) Field of Classification Search
  USPC ...................................... 348/14.08
  See application file for complete search history.

(56) References Cited

U.S. PATENT DOCUMENTS

| 7,398,295 | B2 | 7/2008 | Shoroff et al. |
| 8,005,203 | B2 | 8/2011 | Archambault et al. |
| 9,521,170 | B2 | 12/2016 | Bader-natal et al. |
| 9,578,073 | B2 | 2/2017 | Bader-natal et al. |
| 9,674,243 | B2 | 6/2017 | Bader-natal et al. |
| 9,674,244 | B2 | 6/2017 | Katzman et al. |
| 9,961,119 | B2 | 5/2018 | Bader-Natal et al. |
| 10,091,257 | B2 | 10/2018 | Coffman et al. |
| 10,666,696 | B2 | 5/2020 | Bader-natal et al. |
| 2014/0362165 | A1* | 12/2014 | Ackerman .......... H04L 65/4076 348/14.07 |
| 2016/0234264 | A1* | 8/2016 | Coffman ............. H04L 65/4053 |

FOREIGN PATENT DOCUMENTS

WO    WO-2011137284 A2 *  11/2011    ......... H04L 12/1822

* cited by examiner

*Primary Examiner* — Amal S Zenati
(74) *Attorney, Agent, or Firm* — Kilpatrick Townsend & Stockton LLP

(57) ABSTRACT

One example system for providing notifications to videoconferencing sub-meetings includes a processor and at least one memory device. The processor establishes a videoconferencing session associated with a host. The videoconferencing session can include a main meeting, a sub-meeting, and a waiting queue. The processor can move the host from the main meeting to the sub-meeting, and subsequently move a new participant into the waiting queue. The processor can generate a notification that the participant has entered the waiting queue and determine that the host has moved to the sub-meeting. The processor can route, to the host in the sub-meeting using a stored connection of the host to the main meeting, a notification of the participant entering the waiting queue, and subsequently allow the host to admit the new participant.

20 Claims, 7 Drawing Sheets

US 11,336,864 B1

WAITING NOTIFICATIONS FOR VIDEOCONFERENCING SUB-MEETINGS

FIELD

The present application generally relates to videoconferences and more particularly relates to systems and methods for managing participants waiting to enter a videoconferencing meeting from a queue or waiting room.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for providing waiting notifications for videoconferencing sub-meetings. One example system includes a processor and at least one memory device. The memory device includes instructions that are executable by the processor to cause the processor to establish a videoconferencing session associated with a host. The videoconferencing session includes a main meeting, a first sub-meeting, and a waiting queue. The instructions further cause the processor to move the host from the main meeting to the first sub-meeting, and to receive, from a client device, a request from a participant to join the videoconferencing session. The instructions also cause the processor to move, in response to the request, the participant into the waiting queue. The instructions cause the processor to generate a notification that the participant has entered the waiting queue and determine that the host has moved to the first sub-meeting. The instructions also cause the processor to route, to the host in the first sub-meeting using a stored connection of the host to the main meeting, a notification of the participant entering the waiting queue.

One example method includes establishing a videoconferencing session associated with a host. The videoconferencing session includes a main meeting, a first sub-meeting, and a waiting queue. The method further includes moving the host from the main meeting to the first sub-meeting, and receiving, from a client device, a request from a participant to join the videoconferencing session. The method also includes moving, in response to the request, the participant into the waiting queue. The method includes generating a notification that the participant has entered the waiting queue and determining that the host has moved to the first sub-meeting. The method further includes routing, to the host in the first sub-meeting using a stored connection of the host to the main meeting, a notification of the participant entering the waiting queue.

One example non-transitory computer-readable medium includes code that is executable by a processor for causing the processor to establish a videoconferencing session associated with a host. The videoconferencing session includes a main meeting, a first sub-meeting, and a waiting queue. The instructions are further executable to cause the processor to move the host from the main meeting to the first sub-meeting, and to receive, from a client device, a request from a participant to join the videoconferencing session. The instructions are further executable to cause the processor to move, in response to the request, the participant into the waiting queue. The instructions are further executable to cause the processor to generate a notification that the participant has entered the waiting queue and determine that the host has moved to the first sub-meeting. The instructions are also executable to cause the processor to route, to the host in the first sub-meeting using a stored connection of the host to the main meeting, a notification of the participant entering the waiting queue.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
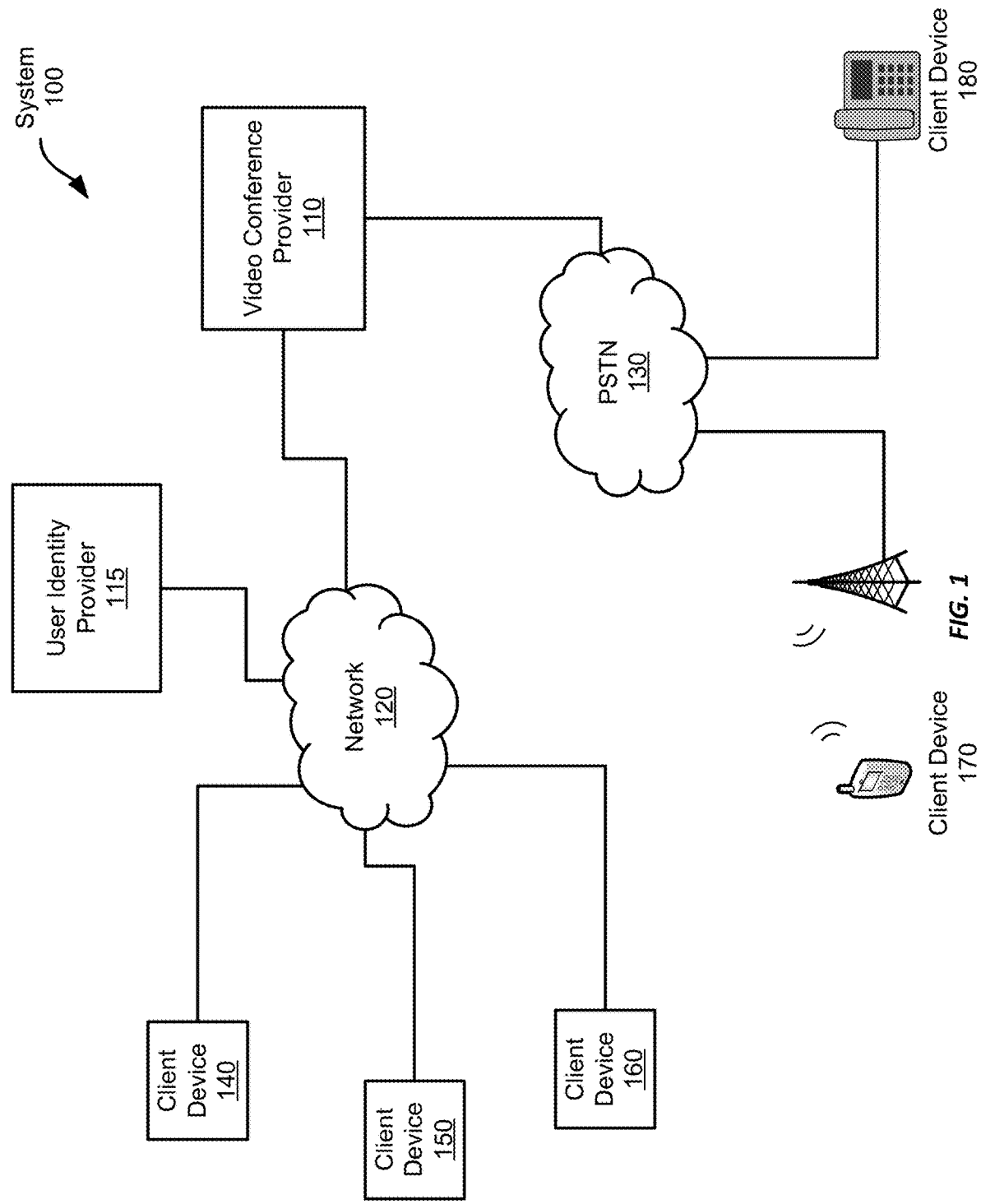
FIGS. 1-5 illustrate example systems to enable waiting notifications for videoconferencing sub-meetings.

Examples are described herein in the context of systems and methods for providing waiting notifications to a host in a videoconferencing sub-meeting. In some examples, a waiting queue can be managed from the videoconferencing sub-meeting. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the videoconferencing system, creates a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session. This control and management typically includes managing sub-meetings, sometimes referred to as "breakout rooms."

Sub-meeting commands may include commands to start a sub-meeting, move participants into a sub-meeting, move participants out of a sub-meeting, or end the sub-meeting. In addition to managing sub-meetings by issuing commands, a host can enter a sub-meeting in order to participate in any discussion or exchanges taking place in the sub-meeting.

The control and management exercised by a videoconference host can also include admitting participants from a waiting queue, sometimes referred to as a waiting room or a lobby. Participants who have been invited or otherwise seek to join a videoconferencing session, once authenticated, can optionally be placed in a waiting queue to wait for a host to expressly admit them to the videoconferencing session. This waiting queue function provides a layer of security against individuals who seek to join a videoconferencing session by mistake, or for nefarious reasons, by allowing the host to verify that the participant is expected or at least welcome before allowing the participant into the videoconferencing meeting from the waiting queue. However, since the main meeting and sub-meetings, once created, take place independently, waiting queue notification messages intended for a host may not be received by the host when the host is in a sub-meeting. In particular, because the waiting queue is a queue to enter the main meeting, notifications sent from the waiting queue are sent to the main meeting. However, if the host is not in the main meeting, but instead has moved to a sub-meeting, the host will not receive the notification.

To provide more versatility and convenience for waiting queue notifications and for managing the waiting queue for videoconferencing meetings, a videoconferencing system according to this disclosure enables a host or co-host in a sub-meeting to receive a notification that a participant has entered the waiting queue to the main meeting. Such a notification may be referred to herein as a "waiting notification." Furthermore, the videoconferencing system enables the host or co-host to remain in the sub-meeting and provide control input to the system to admit a participant from the waiting queue into the videoconferencing meeting. The participant may also be moved to a sub-meeting while the host or co-host managing the waiting queue remains in the same or a different sub-meeting. The participant can be moved to a sub-meeting either based on a stored pre-assignment or based on control input received from a host.

A videoconferencing system can provide notifications to a host in a sub-meeting by maintaining a stored list of meeting connections for each participant in a videoconferencing meeting, including hosts. The stored connections include a connection of each host (including co-hosts, if any) to the main meeting of the videoconferencing session. The connection of the host to the main meeting ensures that the host is treated as part of the main meeting for messaging purposes, even when the host is participating in a sub-meeting. The host can thus receive notifications from and provide control input to the system in the same manner as when the host is in the main meeting of the videoconferencing session.

The techniques disclosed herein for providing waiting notifications for videoconferencing sub-meetings provide convenience to users. Without provision for waiting notifications to a host while the host is in a sub-meeting, a host would need to return to the main meeting at regular intervals to determine if a participant is in the waiting queue seeking admission to the videoconferencing session. Providing for control input from a host while in a sub-meeting in order for the host to manage the waiting queue by admitting (or denying) access to the videoconferencing session by participants in the waiting queue provides further convenience to users. These features reduce waiting time for meeting participants in the waiting queue, and reduce the effort and burden on hosts managing videoconferencing meetings.

This illustrative example is given to introduce the reader to the general subject matter discussed herein and the disclosure is not limited to this example. The following sections describe various additional non-limiting examples and examples of systems and methods for providing notifications to and managing a waiting queue from videoconferencing sub-meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in videoconferences hosted by the video conference provider 110. For example, the video conference provider 110 can be located within a private network to provide videoconferencing services to devices within the private network, or it can be connected to a public network, e.g., the internet, so it may be accessed by anyone. Some examples may even provide a hybrid model in which a video conference provider 110 may supply components to enable a private organization to host private internal videoconferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
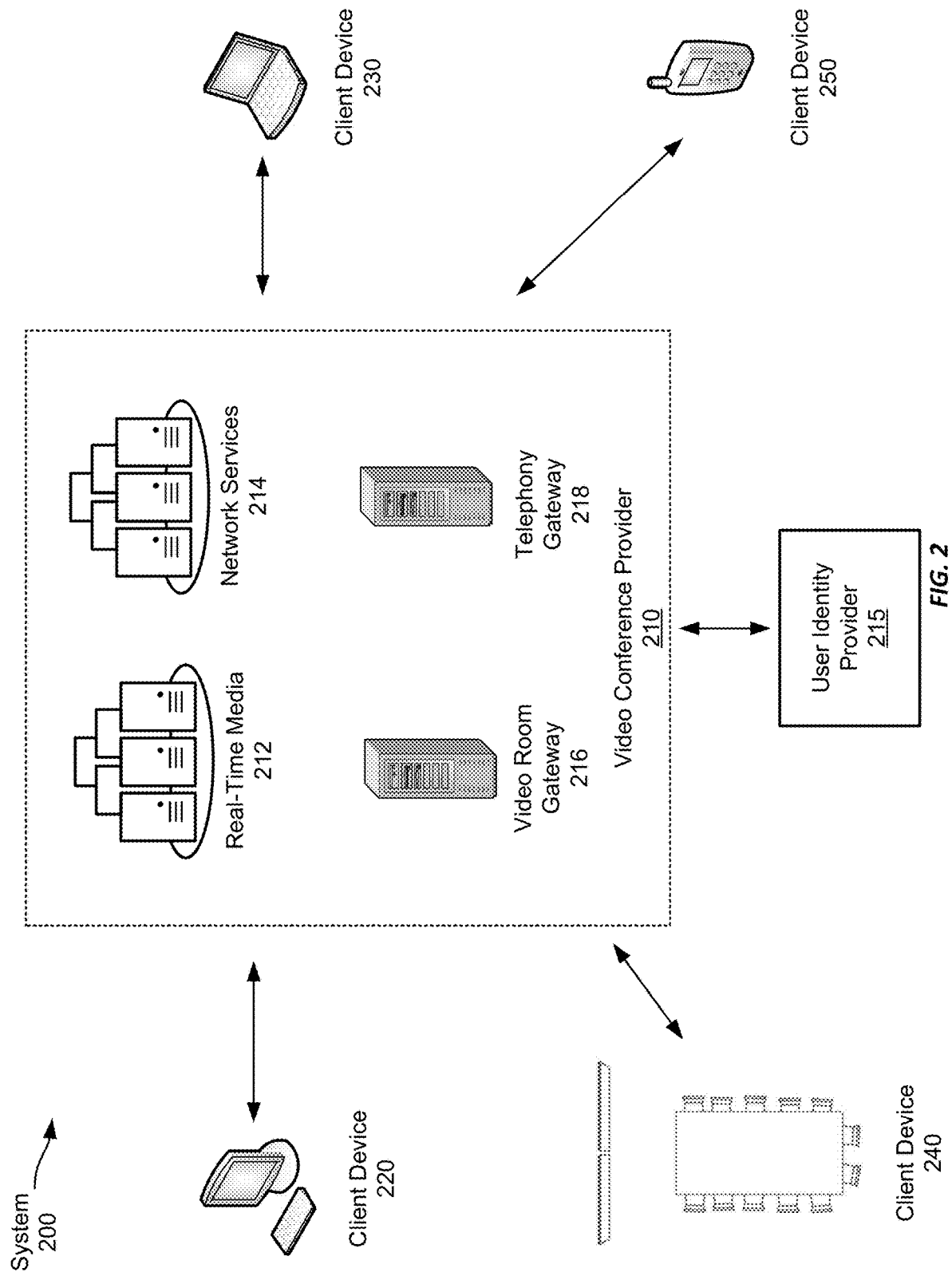

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated videoconferencing equipment. Each of these devices may provide both audio and video capabilities and may enable one or more users to participate in a videoconference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based videoconferencing hardware to dedicated videoconferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of videoconference functionality, thereby enabling the various client devices to create and participate in videoconference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "breakout" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a breakout room for one or more meeting participants to join, such a command may also be handled by a network services server 214, which may create a new meeting record corresponding to the breakout room and then connect one or more meeting participants to the breakout room similarly to how it originally admitted the participants to the meeting itself.

In addition to creating and administering on-going meetings, the network services server(s) 214 may also be responsible for closing and tearing down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conference providers according to this description.

Referring now to the video room gateway servers 216, these servers 216 provide an interface between dedicated videoconferencing hardware, such as may be used in dedicated videoconferencing rooms. Such videoconferencing hardware may include one or more cameras and microphones and a computing device designed to receive video and audio streams from each of the cameras and microphones and connect with the video conference provider 210. For example, the videoconferencing hardware may be provided by the video conference provider to one or more of its subscribers, which may provide access credentials to the videoconferencing hardware to use to connect to the video conference provider.

The video room gateway servers 216 provide specialized authentication and communication with the dedicated videoconferencing hardware that may not be available to other client devices 220-230, 250. For example, the videoconferencing hardware may register with the video conference provider when it is first installed and the video room gateway may authenticate the videoconferencing hardware using such registration as well as information provided to the video room gateway server(s) 216 when dedicated videoconferencing hardware connects to it, such as device ID information, subscriber information, hardware capabilities, hardware version information etc. Upon receiving such information and authenticating the dedicated videoconferencing hardware, the video room gateway server(s) 216 may interact with the network services servers 214 and real-time media servers 212 to allow the videoconferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
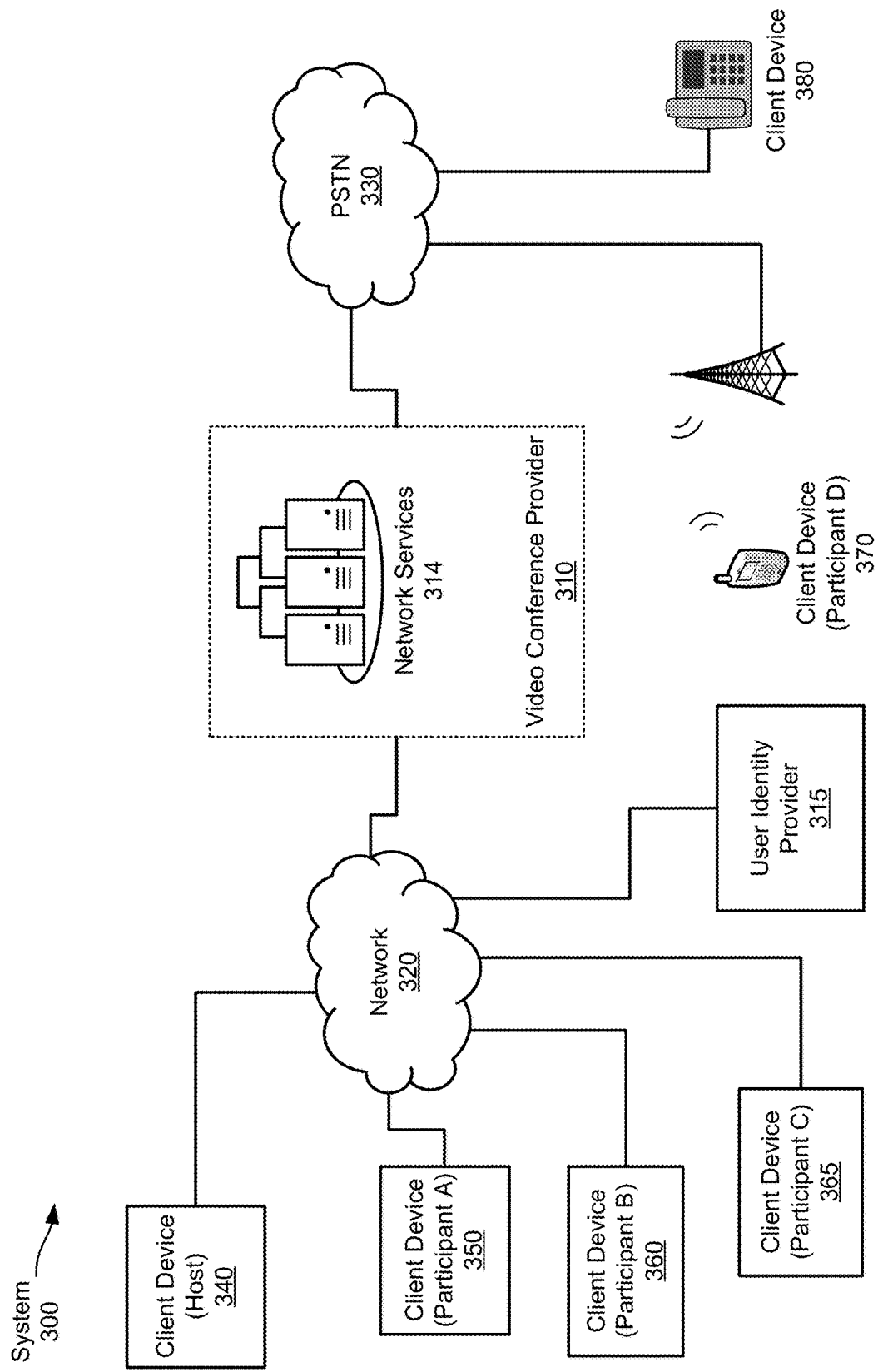

Referring now to FIG. 3, FIG. 3 illustrates an example system 300 including waiting queue notifications for hosts in sub-meetings. FIG. 3 includes components similar to those shown in FIGS. 1 and 2. In this example, the system 300 includes a public user identity provider 315 through which individuals can establish identities that may be used to access various online services, including videoconference services provided by the video conference provider 310. In this example, when users attempt to access videoconferences hosted by the video conference provider 310, the video conference provider 310 attempts to verify each participant, such as by communicating with the user identity provider 315.

When a user establishes an identity with the user identity provider 315, they provide certain personal information, such as a name, address, birth date, email address(es), etc. The user identity provider 315 may then establish an identity for the user that provides certain functionality, such as an identity indicator (e.g., an account or user name), cryptographic signatures, etc., that the user may employ to access various online services. In some examples, the user may be able to connect to the video conference provider 310 and login into an account with the video conference provider 310 using the user identity provider 315 to access functionality provided by the video conference provider 310. However, in some examples, a participant or host of a videoconference may not have, or may not want, an account with the video conference provider 310.

To accommodate such unregistered users, the video conference provider 310 may require users to provide a user identifier, such as an identity established with the user identity provider, before admitting them to a videoconference or allowing them to create a videoconference. After receiving the user's identity and potentially additional information, such as cryptographic information, the network services server(s) 314 operated by the video conference provider 310 may communicate with the user identity provider 315 to verify that the identity is valid and to authenticate the user. After verifying the user's identity, the video conference provider 310 may then admit them to a scheduled meeting, admit them to a waiting queue for a scheduled meeting, or allow them to host a scheduled meeting.

Using such a publicly available user identity provider may provide broader access to videoconferencing services without requiring individuals to register with the video conference provider. This may reduce the burden on the user, who may instead be able to use an existing identity.

Participants in a videoconferencing meeting taking place on system 300 use client devices 340-380 connected either using network 320 or PSTN 330. In this example, the participant using client device 340 is a host of a videoconferencing meeting. The host may be granted administrative privileges by the video conference provider 310 to allow client device 340 to manage meetings, such as by enabling or disabling screen sharing, muting or removing users from the meeting, admitting users from the waiting queue, creating sub-meetings or "breakout" rooms, recording meetings, etc. Such functionality may be managed by the network services server(s) 314 at the video conference provider 310. Client devices 350, 360, and 365 are used by participant A, participant B, and participant C, respectively, to access the videoconferencing meeting taking place on system 300. Client device 370 is used by participant D to access the videoconferencing meeting taking place on system 300. The host may designate any participant as a co-host (not shown). Co-hosts, through their respective client devices, may be granted administrative privileges equal to the host by the video conference provider 310, or may have a subset of administrative privileges according to different examples, such as managing sub-meetings using their respective client devices.

Figure 4:
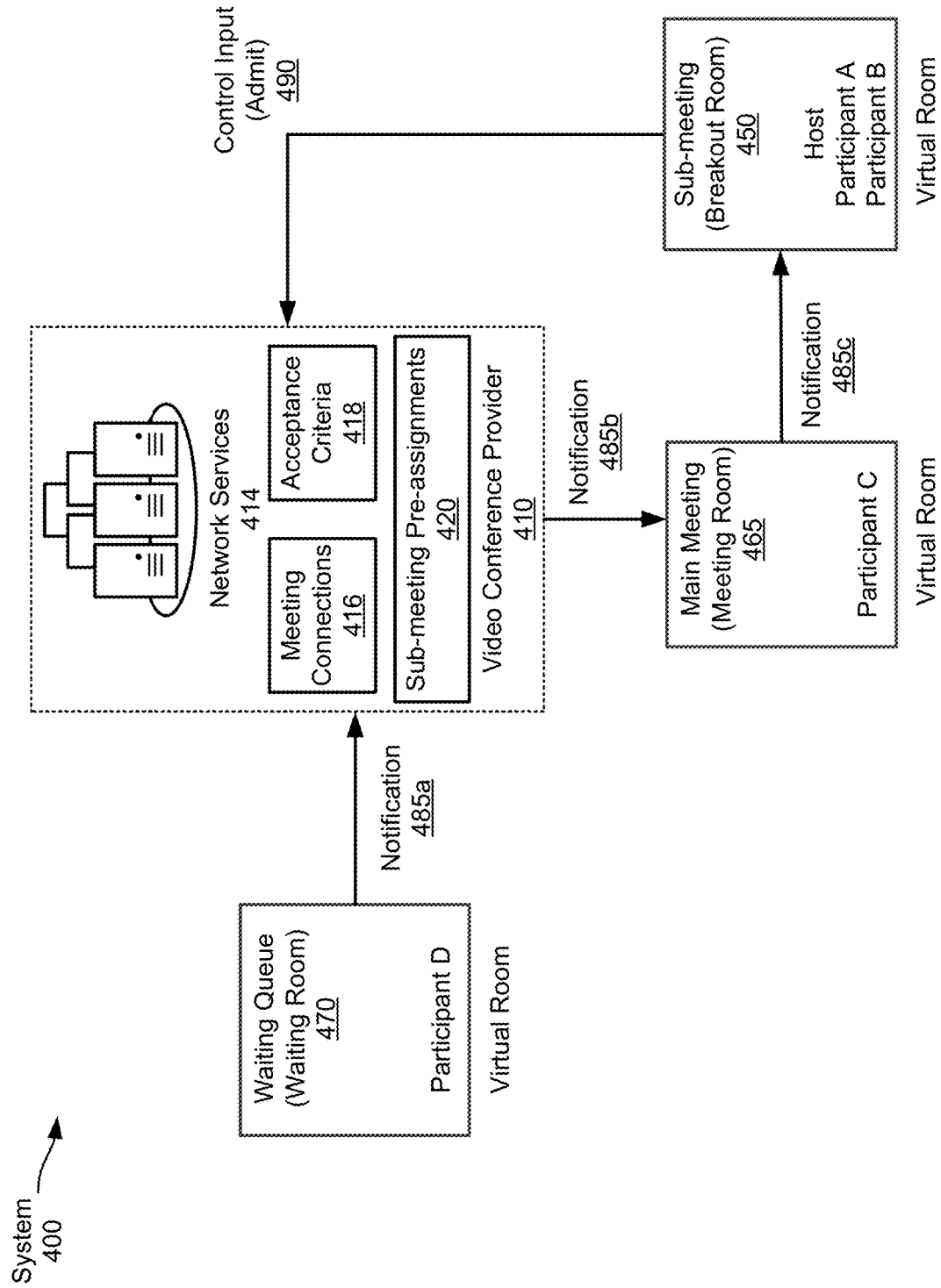

Referring to FIG. 4, FIG. 4 shows another example system 400 for providing notifications to and managing a waiting queue from videoconferencing sub-meetings. Example system 400 includes video conference provider 410 and network services server(s) 414. Resources of the video conference provider 410 can include stored, meeting connections 416, stored acceptance criteria 418, and stored sub-meeting pre-assignments 420. The stored meeting connections include identifiers for each participant and host as well as meetings to which each participant and host is subscribed. A subscription to a meeting can be for one or more multimedia data streams (e.g., audio or video streams) and/or control streams. A participant or host, through a client device, can be subscribed to multiple meetings, e.g., the host can be subscribed to control streams from one meeting and can also be subscribed to multimedia streams from another meeting. Thus, a subscription to a meeting may involve being subscribed to multiple different data streams associated with that meeting. The stored meeting connections provide a reference that can be used for messaging and other services to determine which streams a particular participant (whether a host or not) is subscribed to. Client devices for these participants are connected to the meeting servers, including network services servers 414 using TCP or UDP. For example, a service connection may be maintained using TCP and data may be exchanged using UDP. For purposes of a host being able to receive notifications while in a breakout room, a stored meeting connection of the host to the main meeting ensures that the host is treated as part of the main meeting for messaging purposes when the host is participating in a sub-meeting.

Stored acceptance criteria 418 can include, as examples, whether a notification of a request to move a participant is sent to the participant, and whether the move is stopped if the participant does not accept, or does not accept within a certain amount of time. The notification can be transmitted selectively based on the criteria, that is, transmitted if specified, or omitted if not specified. If no notification is specified as part of the criteria, the action can be executed when invoked, taking into account any normal system delays. As an example, if the acceptance criteria require notification to the participant, the notification can take the form of a pop-up window presented on the client device of the participant that states that the participant is being invited to a breakout room or back to the main room, as the case may be. The pop-up window can also provide virtual buttons that can be selected by the participant to accept the invitation or to remain in place.

Sub-meeting pre-assignments 420 include a list of participants or characteristics of participants for which an assignment to a sub-meeting has been made in advance and stored. For example, such pre-assignments can be made by a meeting host, either for a specific meeting or as standing pre-assignments. With sub-meeting pre-assignments 420, a participant can be assigned to a sub-meeting automatically as soon as the participant is moved from a waiting queue to a main meeting. In this example, the move is subject to acceptance criteria 418 just as would be the case if a host assigned the participant to a sub-meeting in real time using a control input at a client device.

System 400 in this example is maintaining a sub-meeting (breakout room) 450 including the host, participant A, and participant B. System 400 is also maintaining a main meeting room 465 including participant C. System 400 is also maintaining a waiting queue (waiting room) 470 in which participant D is waiting to be admitted to the videoconferencing meeting. The main videoconferencing meeting 465 can be presented to users as a virtual meeting room with visual representations of some or all of the participants provided either by their respective video feed or an identifier, such as their name. Sub-meeting 450 can be presented to users as a virtual breakout room, similarly to how the main meeting is presented to users. System 400 can create additional sub-meetings as needed. Each virtual room includes participants, the identities of which can be accessed and presented as a list in a user interface displayed by client devices with appropriate display capabilities. The experience of videoconferencing using virtual rooms thus substantially replicates the experience of holding a gathering in a main conference room in which participants divide into groups and meet in additional conference rooms or offices.

In system 400, once the videoconferencing session associated with a host has been established and the host has moved to sub-meeting 450, participant D is authenticated and enters waiting queue 470. A notification 485*a* that participant D is in the waiting queue is generated at network services servers 414. Since the host is listed in the meeting connections 416 as subscribed to the main meeting 465, the notification is routed at 485*b* through the connection to the main meeting by default. The system then checks meeting subscriptions for the host and determines that the host is now also subscribed to the sub-meeting 450. A second notification is then generated and routed at 485*c* to sub-meeting 450 where it can be displayed to the host. A control input 490 directed to admitting participant D to the videoconferencing meeting can be provided by the host, for example, using client device 340. The input directed to admitting the participant to the videoconferencing meeting can be provided selectively, that is it can be provided, not provided, or an input directing that participant D not be admitted to the meeting can be provided.

In the example of system 400, participant D may be admitted to main meeting 465 and then assigned to sub-meeting 450 by the host. In this case, a connection for both media and control to the main meeting is initially established for participant D. When participant D is moved to the sub-meeting, participant D then subscribes to the sub-meeting, e.g., a connection is established between participant D and one or more data or control streams from the sub-meeting 450. In addition, participant D is unsubscribed from the main meeting. Thus, the stored meeting connections are updated to reflect participant D being moved to the sub-meeting. Alternatively, a sub-meeting pre-assignment for participant D may be stored among sub-meeting pre-assignments 420. In such a case, participant D may be moved automatically to sub-meeting 450. Alternatively, participant D may be moved to a second sub-meeting (not shown) created based on the pre-assignment, or created in advance. In the case of any of these moves, acceptance criteria 418 may be applied, for example, requiring participant D to be given notice of the assignment and to accept an invitation to the sub-meeting.

Figure 5:
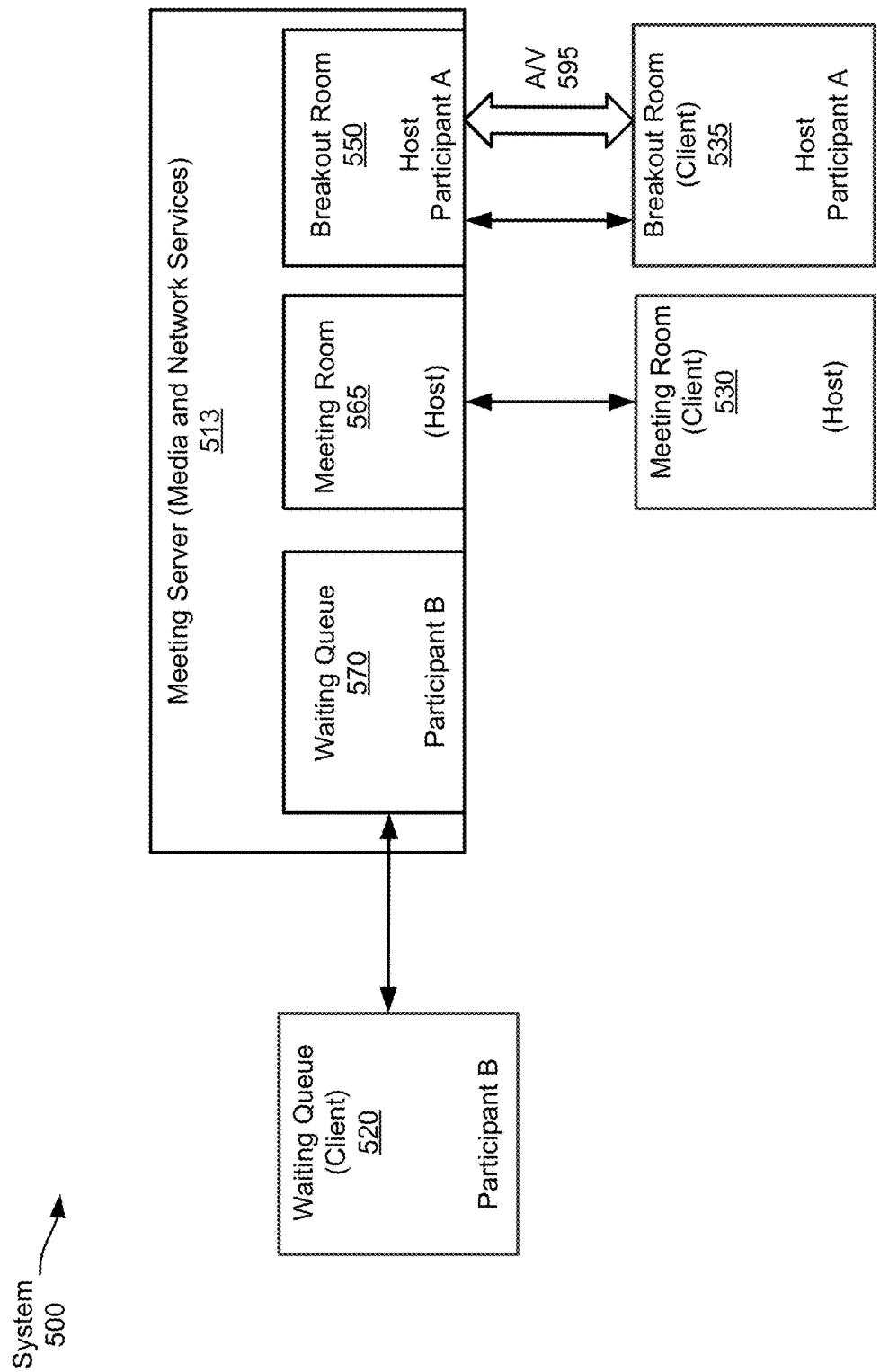

Referring to FIG. 5, FIG. 5 shows another example system 500 for providing notifications to and managing a waiting queue from videoconferencing sub-meetings. Example system 500 includes meeting server 513. Meeting server 513 may also be referred to as a multimedia router and can be implemented by the real-time media servers 212 working with the network services servers 214. The meeting server maintains stored representations of the meetings and sub-meetings taking place in the system so that the meeting server can keep track of the status of meetings and sub-meetings without constantly exchanging this information with client devices. Some client devices also maintain stored representations of the meetings or sub-meetings to which the associated participant or host is subscribed so that virtual meeting rooms can be displayed to the user. System 500 includes a waiting queue representation 520 maintained on a client device and a waiting queue representation 570 on meeting server 513. In this example, the waiting queue includes participant B. System 500 also includes a main meeting room representation 530 on a client device, and a main meeting room representation 565 on meeting server 513. In this example, no users are visible in the main meeting room.

In system 500, the host maintains a connection to the main meeting room specified in meeting connections 416. System 500 also includes breakout room representation 535 maintained on a client device and breakout room representation 550 maintained on meeting server 513. The breakout room includes the host and participant A. Communication with the waiting queue and meeting room in system 500 may be restricted to commands and messaging as indicated by the single arrows in FIG. 5. However, since current meeting participants are in the breakout room, communication with the breakout room also includes a media connection, audio/video (A/V) stream 595.

Figure 6:
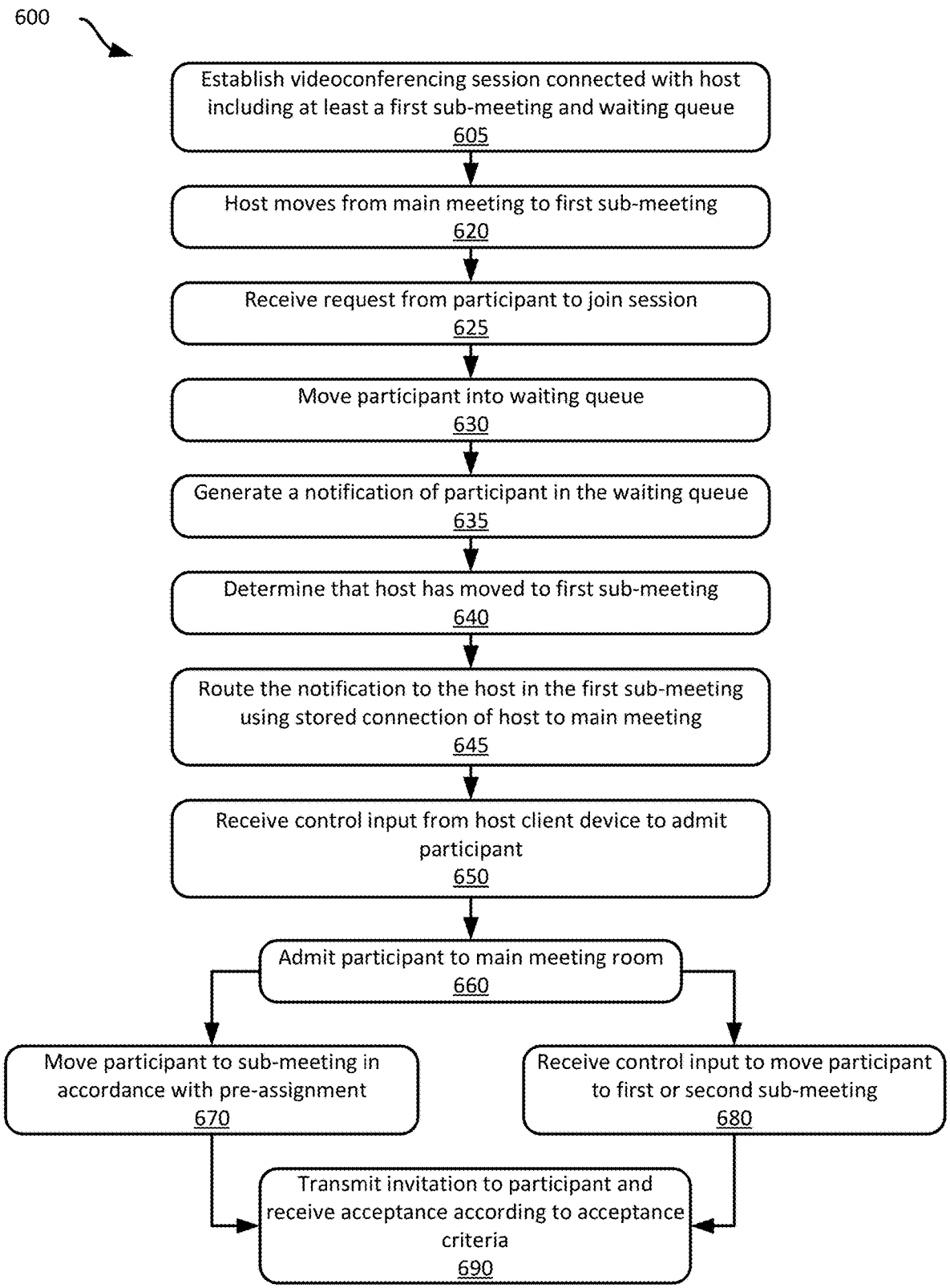
FIG. 6 illustrate example methods for providing waiting notifications for videoconferencing sub-meetings.

Referring now to the method 600 illustrated in FIG. 6, FIG. 6 shows an example method 600 for providing notifications to and managing a waiting queue from videoconferencing sub-meetings. The description of the method 600 in FIG. 6 will be made with reference to the system 400 shown in FIG. 4; however any suitable system according to this disclosure may be used, such as the example systems 100, 200, 300, and 500 shown in FIGS. 1, 2, 3, and 5.

At block 605, a processor at video conference provider 410 establishes a videoconferencing session including a main meeting, a waiting queue, and at least a first sub-meeting. The videoconferencing session is associated with at least one host within meeting connections 416. At block 620, the host moves from main meeting 465 to sub-meeting 450. At block 625, a request is received from a participant to join the videoconferencing session. For example, the request may come from participant D. At block 635, video conference provider 410 generates a notification that the participant has entered the waiting queue, for example, waiting queue 470. Since the host is listed in the meeting connections 416 as subscribed to the main meeting, and notifications are routed to the main meeting by default, at block 640, a determination is made as to whether the host has entered a first sub-meeting. When the host is in the sub-meeting, the processor uses the stored connection between the host and the main meeting to route the notification to the host in the sub-meeting at block 645. By checking the meeting subscriptions for a stored connection to a sub-meeting, the processor can determine if an additional notification is necessary. Otherwise, the host might not receive the notification, because main meetings and sub-meetings are treated as separate meetings by the system. At block 650, a control input is received from the host, through a host client device, to admit the participant from the waiting room 470 to the videoconferencing meeting. In this example, participant D is admitted from waiting queue 470 to the main meeting 465 at block 660 of method 600.

Process 600 can optionally end with the new participant in the main meeting at block 660. Optionally, action may be taken at block 670 to automatically move the participant to a first or second sub-meeting in accordance with a stored pre-assignments 420. Alternatively, the host may manually move the participant to a sub-meeting. In this case, video conference provider 410 receives host control input directing the move at block 680. The control input can be received from the host through a host client device. In either case, the participant may be moved to a sub-meeting in response, or an invitation and acceptance process according to stored acceptance criteria may take place at block 690.

It should be appreciated that the example method 600 may be executed in different orders or multiple blocks may occur substantially simultaneously. For example, blocks 620 or 625 may occur while a meeting is established at block 605. Further, block 660 may be skipped and a participant may be moved directly from the waiting queue to a sub-meeting, or block 660 and 670 may be executed simultaneously.

Figure 7:
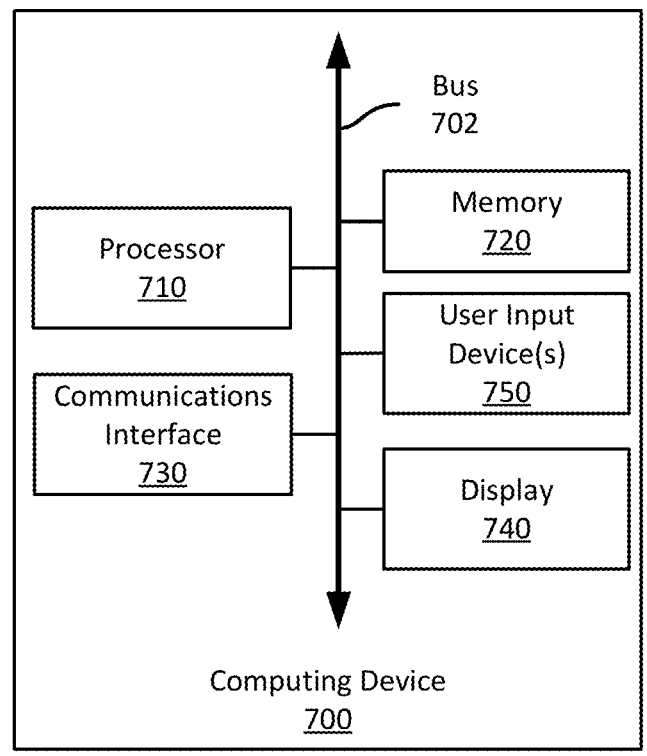
FIG. 7 shows an example computing device suitable for use with any disclosed systems or methods according to this disclosure.

Referring now to FIG. 7, FIG. 7 shows an example computing device 700 suitable for use in example systems or methods for providing notifications to and managing a waiting queue from videoconferencing sub-meetings. The example computing device 700 includes a processor 710 which is in communication with the memory 720 and other components of the computing device 700 using one or more communications buses 702. The processor 710 is configured to execute processor-executable instructions stored in the memory 720 to perform one or more methods for providing waiting notifications and managing a waiting queue according to different examples, such as part or all of the example methods 500, 600 described above with respect to FIGS. 5 and 6. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A system comprising:
a processor; and
at least one memory device including instructions that are executable by the processor to cause the processor to:
establish a videoconferencing session associated with a host, the videoconferencing session including a main meeting, a first sub-meeting, and a waiting queue;
move the host from the main meeting to the first sub-meeting;
create, in a stored list of meeting connections identifying subscribed data streams for messaging, a stored connection between the host and the main meeting;
receive, from a client device, a request from a participant to join the videoconferencing session;
move, in response to the request, the participant into the waiting queue;
generate a notification that the participant has entered the waiting queue;
determine that the host has moved to the first sub-meeting; and
route, to the host in the first sub-meeting, using the stored connection between the host and the main meeting, the notification that the participant has entered the waiting queue.

2. The system of claim 1, wherein the instructions are executable by the processor to cause the processor to provide the notification in the main meeting in addition to routing the notification to the host in the first sub-meeting.

3. The system of claim 1, wherein the instructions are executable by the processor to cause the processor to receive, from the host, a control input directed to selectively admit the participant to the videoconferencing session.

4. The system of claim 3, wherein the instructions are executable by the processor to cause the processor to move the participant from the waiting queue to the main meeting.

5. The system of claim 3, wherein the instructions are executable by the processor to cause the processor to move the participant to the first or a second sub-meeting in accordance with a stored, sub-meeting pre-assignment.

6. The system of claim 3, wherein the instructions are executable by the processor to cause the processor to receive a control input from the host directed to move the participant to the first or a second sub-meeting.

7. The system of claim 3, wherein the instructions are executable by the processor to cause the processor to selectively transmit an invitation for and receive an acceptance of assignment of the participant to the first or a second sub-meeting in accordance with stored acceptance criteria.

8. A method comprising:
establishing a videoconferencing session associated with a host, the videoconferencing session including a main meeting, a first sub-meeting, and a waiting queue;
moving the host from the main meeting to the first sub-meeting;
creating, in a stored list of meeting connections identifying subscribed data streams for messaging, a stored connection between the host and the main meeting;
receiving, from a client device, a request from a participant to join the videoconferencing session;
moving, in response to the request, the participant into the waiting queue;
generating a notification that the participant has entered the waiting queue;
determining that the host has moved to the first sub-meeting; and
routing, to the host in the first sub-meeting, using the stored connection between the host and the main meeting, the notification that the participant has entered the waiting queue.

9. The method of claim 8, further comprising providing the notification in the main meeting in addition to routing the notification to the host in the first sub-meeting.

10. The method of claim 8, further comprising receiving, from the host, a control input directed to selectively admit the participant to the videoconferencing session.

11. The method of claim 10, further comprising moving the participant from the waiting queue to the main meeting.

12. The method of claim 10, further comprising moving the participant to the first or a second sub-meeting in accordance with a stored, sub-meeting pre-assignment.

13. The method of claim 10, further comprising receiving a control input from the host directed to move the participant to the first or a second sub-meeting.

14. The method of claim 10, further comprising selectively transmitting an invitation for and receive an acceptance of assignment of the participant to the first or a second sub-meeting in accordance with stored acceptance criteria.

15. A non-transitory computer-readable medium comprising code that is executable by a processor for causing the processor to:
establish a videoconferencing session associated with a host, the videoconferencing session including a main meeting, a first sub-meeting, and a waiting queue;
move the host from the main meeting to the first sub-meeting;
create, in a stored list of meeting connections identifying subscribed data streams for messaging, a stored connection between the host and the main meeting;
receive, from a client device, a request from a participant to join the videoconferencing session;
move, in response to the request, the participant into the waiting queue;
generate a notification that the participant has entered the waiting queue;
determine that the host has moved to the first sub-meeting; and
route, to the host in the first sub-meeting, using the stored connection between the host and the main meeting, the notification that the participant has entered the waiting queue.

16. The non-transitory computer-readable medium of claim 15, wherein the code is executable by the processor to receive, from the host, a control input directed to selectively admit the participant to the videoconferencing session.

17. The non-transitory computer-readable medium of claim 16, wherein the code is executable by the processor to move the participant from the waiting queue to the main meeting.

18. The non-transitory computer-readable medium of claim 16, wherein the code is executable by the processor to move the participant to the first or a second sub-meeting in accordance with a stored, sub-meeting pre-assignment.

19. The non-transitory computer-readable medium of claim 16, wherein the code is executable by the processor to receive a control input from the host directed to move the participant to the first or a second sub-meeting.

20. The non-transitory computer-readable medium of claim 16, wherein the code is executable by the processor to selectively transmit an invitation for and receive an acceptance of assignment of the participant to the first or a second sub-meeting in accordance with stored acceptance criteria.

* * * * *